United States Patent [19]

van Asten

[11] Patent Number: 4,566,559

[45] Date of Patent: Jan. 28, 1986

[54] SAWING TRESTLE

[76] Inventor: Christianus M. A. J. van Asten, Energiestraat 5, 5753 RN Deurne, Netherlands

[21] Appl. No.: 645,101

[22] Filed: Aug. 28, 1984

[30] Foreign Application Priority Data

Aug. 30, 1983 [NL] Netherlands ........................ 8303017

[51] Int. Cl.[4] ........................ F16M 11/00; B27B 21/02

[52] U.S. Cl. .................................... 182/224; 182/181; 269/296; 269/287; 269/902

[58] Field of Search ................................ 182/224-227, 182/181-185; 269/296, 287, 902

[56] References Cited

U.S. PATENT DOCUMENTS

| | | | |
|---|---|---|---|
| 175,500 | 3/1876 | Redmond | 269/296 |
| 568,543 | 9/1896 | Parks | 269/902 |
| 1,126,544 | 1/1915 | Martin | 269/296 |
| 2,431,589 | 11/1947 | Shuler | 269/296 |
| 4,235,034 | 11/1980 | Black | 248/530 |
| 4,386,678 | 6/1983 | Wendell | 182/185 |
| 4,438,913 | 3/1984 | Hylla | 269/296 |

*Primary Examiner*—Reinaldo P. Machado

*Attorney, Agent, or Firm*—Oblon, Fisher, Spivak, McClelland & Maier

[57] ABSTRACT

A sawing trestle for elongate wooden bodies comprises a single, upwardly extending frame part and two V-shaped members spaced apart by about ten centimeters. The two belts are provided for clamping the elongate bodies on the V-shaped members. The belts each have one end attachable to the frame part and a second end connected to a stretching member so that the belts can extend between ends of the V-shaped members and be stretched around the elongate bodies.

4 Claims, 4 Drawing Figures

SAWING TRESTLE

The invention relates to a sawing trestle for sawing wooden trunks, branches and the like comprising a single, upwardly extending frame part, to the top side of which is fastened a V-shaped supporting member for supporting beams, branches or the like to be sawn and fixing means that can be coupled with the upwardly extending frame part for clamping the trunks or branches between the ends of the V-shaped supporting member.

Such a device is known from German Utility Model DGM No. 8033275. This publication states that the width of the V-shaped supporting member is 15 to 40 cms, preferably about 25 cms. The fixing means is herein a tensile spring, one end of which is fastened to the upwardly extending frame part and the other end of which is connected with a chain, which can be stretched with the aid of stretching bracket. In accordance with the thickness of the trunk to be sawn the stretching bracket can be hooked into one link or another of the chain.

Such a device can, in fact, only be used for sawing trunks, beams or the like one by one. In practice it has been found that when more trunks, branches or the like are clamped on the sawing trestle, and these trunks are subsequently sawn, the saw tends to become jammed. This is due to the fact that the usually crooked trunks or branches are supported at points spaced apart by relatively large distances and then clamped tight with the aid of the fixing means between said points so that the trunks or branches bearing one on the other at further points are bent to an extent such that in sawing these trunks or branches the saw is jammed.

It furthermore appears in practice that after sawing off a first piece from the trunks or branches arranged in a bundle on the sawing trestle the trunks or branches have slightly changed their relative positions so that the bundle is no longer pressed with sufficient force against the supporting member. It is then necessary to restretch the fixing means. In the known device this can be done only by disengaging the hook of the stretching bracket from the chain and by rehooking it in a further link. In practice, however, this will not be feasible since after a first piece is sawn from the trunks or branches united in a bundle the centre of gravity of the bundle will usually lie at the side of the V-shaped supporting member so that upon disengagement of the fixing means the bundle tends to fall off the sawing trestle.

The invention has for its object to provide a sawing trestle of the kind set forth in which the above-mentioned disadvantages of the known sawing trestle are avoided.

According to the invention this can be achieved in that the V-shaped supporting member for a bundle of trunks, beams or the like has a width of about 10 cms and the fixing means comprise two stretching belts, one end of each which is coupled with the upwardly extending frame part, whereas the other ends of the stretching belts are relatively displaceable in the direction of length with the aid of a stretching member and can be fixed in a plurality of relative positions.

In the construction embodying the invention, viewed in the direction of length of the trunks, branches or the like to be supported, only a relatively narrow supporting member is used. It has been found in practice that, when stacking up a bundle of trunks, branches or the like on the V-shaped supporting member they tend to occupy such relative positions that at the level of the V-shaped supporting member the trunks, branches or the like are in contact with one another so that when the fixing means are applied these trunks, branches or the like are prevented from bending between two spaced apart supporting points. In practice it is found that jamming of the saw during sawing of the trunks or branches does practically not occur, since in fixing the trunks or branches no undesirable bending stress capable of causing jamming of the saw is produced in the trunks or branches. Furthermore, by using the fixing means embodying the invention restretching of the fixing means can be carried out in a simple manner without the need for disengaging the fixing means so that the bundle of wood can be retained on the sawing trestle when the fixing means are restretched around the bundle of trunks, branches or the like, even when the centre of gravity of such a bundle is located at the side of the sawing trestle.

By combining the steps embodying the invention a sawing trestle can be obtained, which is particularly suitable for simultaneously sawing trunks, branches or the like united in a bundle. A further advantage of the narrow structure of the device is that it occupies little space and need, therefore, not be built up from a plurality of parts displaceable with respect to one another between an operational position and a storing position occupying little space.

Owing to the narrow structure of the V-shaped supporting member the length of a part of the trunks, branches or the like supported by the V-shaped supporting member can be reduced to about 15 cms by shortening the wood on both sides of the sawing trestle in contrast to the known sawing trestles in which the pieces of wood supported by the sawing trestle often have an undesirably great length.

It is noted that British Patent Specification No. 2,098,922 discloses a sawing trestle comprising a single, upwardly extending frame part, to the top end of which is fastened a plate provided with downwardly extending tines. Along the frame part a support provided with upwardly extending tines is displaceable in a direction of height. Between the tines parts can be clamped the end of a truck or the like to be sawn. Also this device is only suitable for sawing trunks, beams or the like one by one. Apart therefrom and certainly when working heavier trunks clamping a trunk to be sawn is not feasible by one person so that for using such a device there should always be two persons.

The invention will be described more fully hereinafter with reference to an embodiment of a sawing trestle in accordance with the invention shown in the accompanying Figures.

Figure 1:
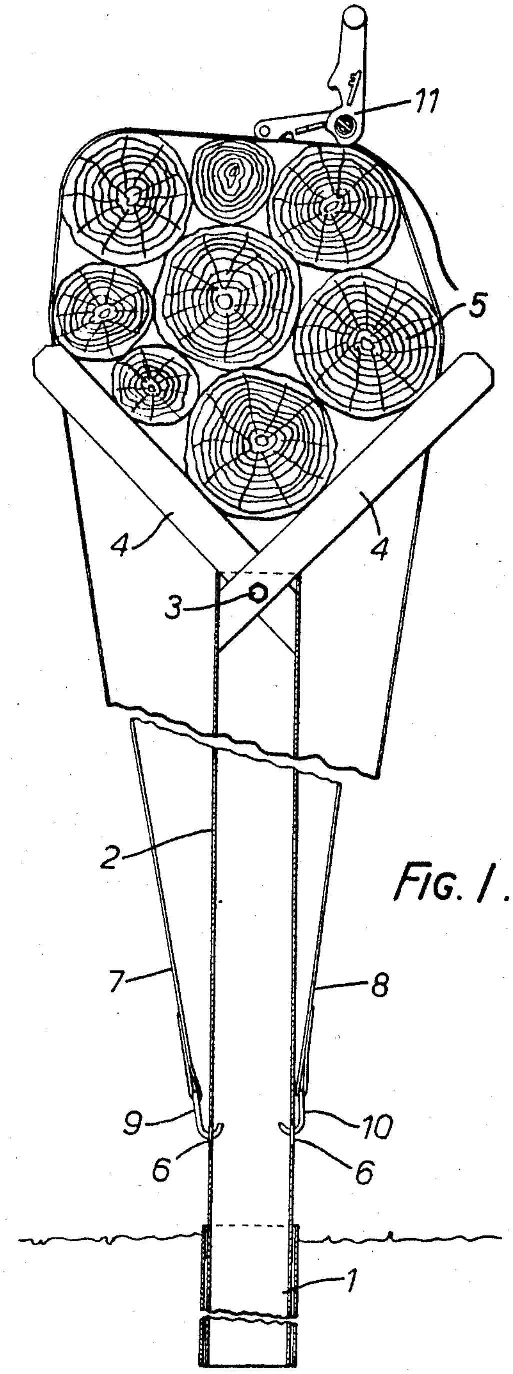
FIG. 1 shows a sawing trestle embodying the invention partly in a sectional view and partly in an elevational view with a number of trunks clamped thereto.

The embodiment shown in the Figures comprises a box-shaped profile 1 to be dug into the ground, into which is inserted the lower end of a box-shaped profile 2. The top end of the profile 2 of square or rectangular cross-section located about one meter above the ground has fastened to it strips 4 with the aid of bolts 3. From FIG. 2 it will be apparent that two strips 4 are fastened to each of two opposite walls of the box-shaped profile, which strips extend in upwardly inclined position away from the other above the box-shaped profile 2 from the fastening point with the bolt 3.

In this way strips 4 are suitable for supporting a number of wooden trunks 5, beams or the like deposited on said strips in the manner shown in the Figures.

Near the part of the box-shaped profile 2 just projecting above the hollow profile 1 holes 6 are provided in opposite walls of the hollow profle. Into these holes 6 are hooked hooks 9 and 10 respectively provided at the ends of belts 7 and 8. The belts 7 and 8 extend upwardly in the manner shown in the Figures between the strips and can be passed in the manner shown in the Figures around a bundle of trunks, beams or the like deposited on the sawing trestle. The ends of the belts 7 and 8 located above the stack can be interconnected with the aid of a stretching clamp 11 and stretched so that with the aid of the belts the trunks, beams or the like 5 are firmly clamped on the sawing trestle. The trunks 5, beams or the like are disposed on the sawing trestle so that the stack is in a state of equilibrium on the sawing trestle before the stretching belts are fixed and clamped tight with the aid of the clamping device 11, for example, a ratchet clamp.

In a practical embodiment the distance between the strips 4 fastened to the opposite walls of the hollow profile 2 is about 10 cms and in practice it has been found that in this way an effective support of trunks, beams or the like up to a length of about 2 meters can be obtained.

Pieces of wood of the desired length can then be sawn off the bundle thus clamped tight. Preferably a wheel-barrow, a basket or the like is placed below the bundle of wood so that the severed pieces of wood are directly collected in the wheel-barrow or the like. Pieces of wood of the desired length may be sawn off at alternating ends or, as the case may be, pieces of wood of the desired length may be sawn off simultaneously on both sides of the sawing trestle. Since so to say the bundle of wood is deposited only at substantially one point, the risk of jamming of the saw is practically excluded. Moreover, when shortening the wood, the stack of wood need not be displaced, which also permits rapid shortening of the wood.

It will be obvious that within the spirit and scope of the invention modifications of the above-described embodiment of the construction in accordance with the invention in the Figures are conceivable. For example, the sawing trestle may be fixed in a different way than with the aid of box-shaped profiles dug into the ground.

Figure 2:
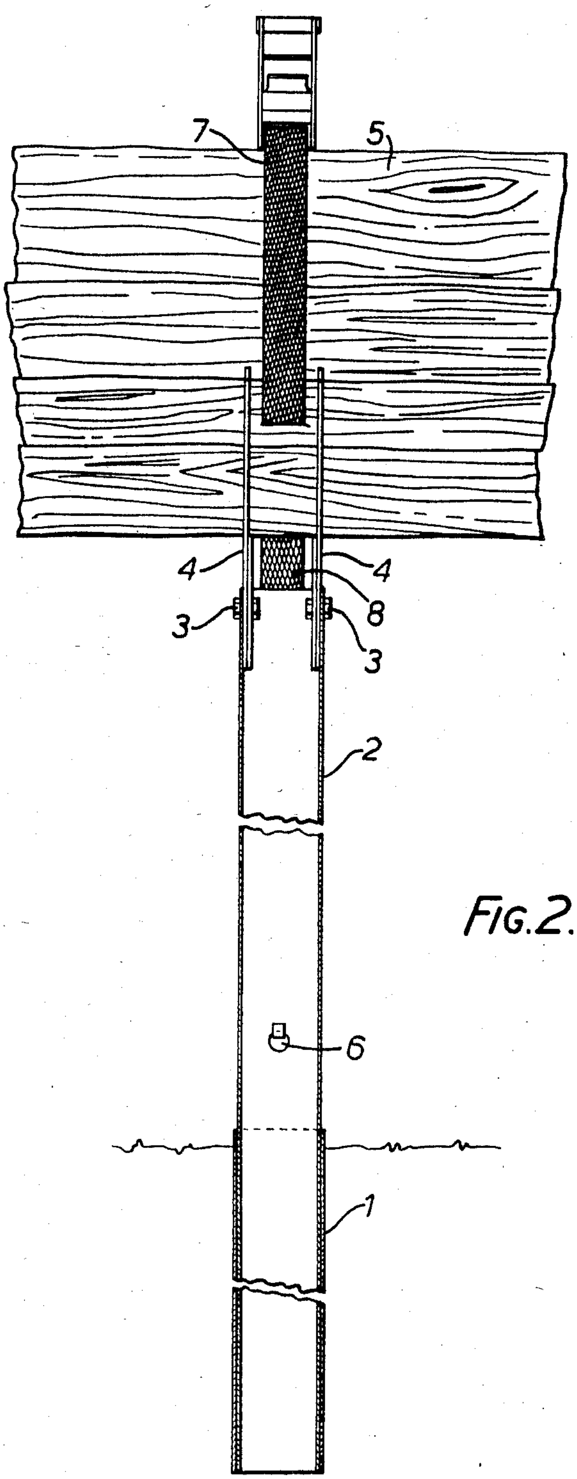
FIG. 2 is a side elevation of the trestle of FIG. 1.
Figure 3:
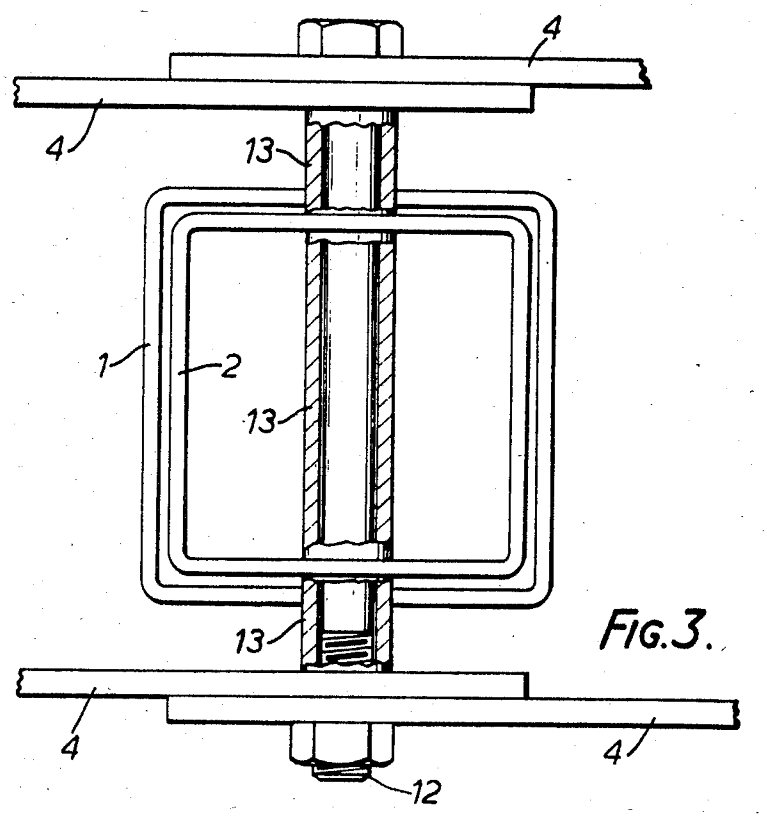
FIG. 3 is a plan view of part of a second embodiment of a sawing trestle embodying the invention.
Figure 4:
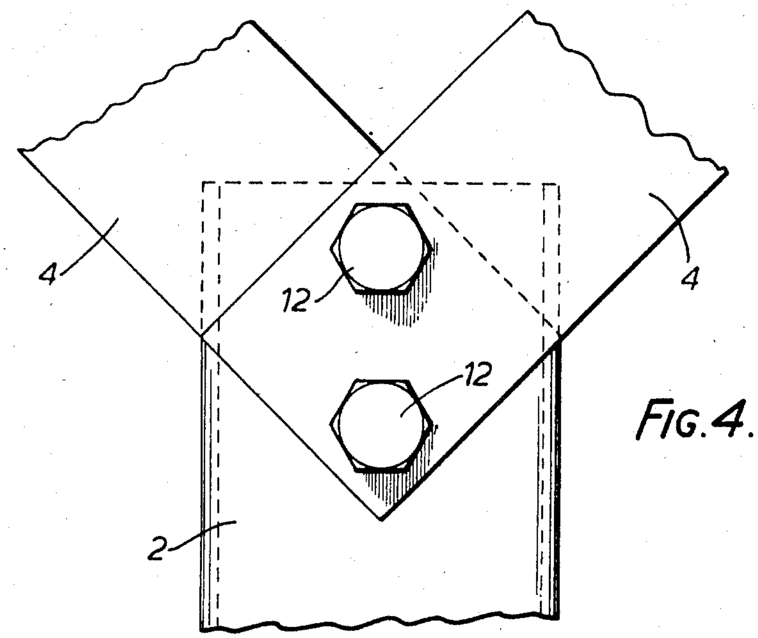
FIG. 4 is a side elevation of the trestle of FIG. 3.

FIGS. 3 and 4 show a second embodiment of a sawing trestle. The parts corresponding with the parts shown in FIGS. 1 and 2 are designated in FIGS. 3 and 4 by the same reference numberals. In this embodiment the strips are located outside the box-shaped profile. The lower ends of the strips 4 are fastened with the aid of two bolts 12 lying one above the other to the top end of the box-shaped profile 2. The bolts are surrounded by spacer sleeves 13.

The figures used in the claims are only meant to explain more clearly the intention of the invention and are not supposed to be any restriction concerning the interpretation of the invention.

I claim:

1. A sawing trestle for elongate wooden bodies, comprising:

a single, upwardly extending frame part;

a supporting means having a V-shape when seen along a first direction, said supporting means having a width of about 10 cm in said first direction and being secured to a top end of said frame part, whereby said elongate wooden bodies may be positioned and supported on said V-shaped supporting means with elongate axes of said bodies generally extending in said first direction; and means for clamping said elongate bodies on said supporting means, said means for clamping comprising two belts, each of said belts having one end attachable to said frame part and a second end, said second ends being connected to a stretching member such that said belts can extend between ends of said supporting means in said first direction and be stretched around bodies supported on said supporting means and adjusted by said stretching member to clamp said bodies.

2. The sawing trestle of claim 1 wherein said supporting means comprise two V-shaped members spaced by about 10 cm in said first direction.

3. A sawing trestle as claimed in claim 1 or 2 wherein said upwardly extending frame part is formed by a single profiled beam.

4. A sawing trestle as claimed in claims 3 or 1 or 2 including a box-shaped member insertable into the ground, the lower end of the upwardly extending frame part being removable accommodated in said box-shaped member.

* * * * *